United States Patent [19]

Kyo et al.

[11] 4,171,330

[45] Oct. 16, 1979

[54] FIRE-RETARDANT RESIN COMPOSITION

[75] Inventors: Kayomon Kyo, Kyoto; Katsuhiro Hirose, Uji; Kenji Yasue, Uji; Sinichi Tokumitsu, Uji; Haruo Kohyama, Uji, all of Japan

[73] Assignee: Unitika Ltd., Amagasaki, Japan

[21] Appl. No.: 871,168

[22] Filed: Jan. 20, 1978

[51] Int. Cl.$^2$ .............................................. C08L 77/00
[52] U.S. Cl. .............................. 525/180; 260/45.75 R; 260/457 RT; 260/45.95 R; 528/194; 525/181; 525/425
[58] Field of Search ................................ 260/857 PE

[56] References Cited

U.S. PATENT DOCUMENTS

| | | | |
|---|---|---|---|
| 4,035,333 | 7/1977 | Kamada | 260/857 PE |
| 4,052,481 | 10/1977 | Asahara | 260/857 PE |

OTHER PUBLICATIONS

Aoyama, Toshikazu et al., Chemical Abstracts, vol. 85, No. 79095W citing therein Japan Kokai 76 62,838 (Toray Industries), 5/31/76.

*Primary Examiner*—Paul Lieberman
*Attorney, Agent, or Firm*—Sughrue, Rothwell, Mion, Zinn and Macpeak

[57] ABSTRACT

A fire-retardant resin composition comprising
(A) an aromatic copolyester derived from
  (1) a mixture of terephthalic acid and isophthalic acid or the functional derivatives thereof and
  (2) a bisphenol or the functional derivatives thereof,
(B) a polyamide,
(C) a polyalkylene phenylene ester or a polyalkylene phenylene ester ether and
(D) an aromatic halogen compound. The resin composition has superior moldability, and molded articles prepared from the resin composition have superior chemical properties, thermal stability, mechanical properties and fire retardancy. The resin composition may additionally contain (E) a fire-retardant assistant.

27 Claims, No Drawings

FIRE-RETARDANT RESIN COMPOSITION

BACKGROUND OF THE INVENTION

1. Field of the Invention

This invention relates to a fire-retardant resin composition obtained by incorporating an aromatic halogen compound and, optionally, a fire-retardant assistant in a resin composition comprising an aromatic copolyester, a polyamide and a polyalkylene phenylene ester or a polyalkylene phenylene ester ether.

2. Description of the Prior Art

U.S. Pat. No. 4,052,481 discloses a resin composition comprising (A) 1 to 98.9% by weight of an aromatic copolyester, (B) 1 to 98.9% by weight of a polyamide and (C) 0.1 to 98% by weight of a polyalkylene phenylene ester or a polyalkylene phenylene ester ether, which has superior moldability, mechanical properties, chemical properties, electrical properties and thermal stability, and which is expected to have a very wide range of applications as electric component parts, automobile parts and machine parts. However, the fire retardancy of this resin composition is not sufficient and it has been strongly desired to increase its fire retardancy.

Techniques for rendering such a resin composition fire-retardant are not disclosed in the art.

Methods heretofore suggested for rendering aromatic polyesters fire-retardant include, for example, a method which comprises incorporating a halogenated organic compound, titanium phosphate and antimony oxide in aromatic polyesters (e.g., as disclosed in Japanese patent application (OPI) No. 17556/77), and a method involving adding a halogenated phenol to the polymerization system (e.g., as disclosed in Japanese Pat. No. 7470/77).

Prior techniques for rendering polyamides fire-retardant include, for example, a method which involves using both a halogenated aliphatic hydrocarbon and a phosphoric acid ester with the polyamide (e.g., as disclosed in Japanese patent application (OPI) No. 19798/77), a method involving adding melamine to the polyamide (e.g., as disclosed in Japanese Pat. No. 1994/67), a method comprising adding isocyanuric acid to the polyamide (e.g., as disclosed in Japanese Pat. No. 105744/75), and a method which comprises adding an amide-type compound to the polyamide and treating the composition with water to prevent the fire retardant from bleeding out of the composition (e.g., as disclosed in Japanese patent application (OPI) No. 16581/77).

When the above-described fire retarding compounds are added to the resin composition composed of components (A), (B) and (C) as set forth above, the thermal stability of the composition at the time of melting is poor, and the composition decomposes during processing, for example, on extrusion or injection molding, and the superior properties of the resin composition are markedly deteriorated. Alternatively the fire retardants bleed out with time, or the fire retardancy imparted is not sufficient. Hence, it has been necessary to discover suitable fire retardants for such a resin composition.

It is also known that an aromatic halogen compound or a mixture of an aromatic halogen compound with antimony oxide can be added to a composition comprising an aromatic polyester, a polycarbonate and/or a polyalkylene terephthalate to render the composition fire retardant (e.g., as disclosed in Japanese patent application (OPI) No. 69558/76). However, this composition differs from, e.g., that disclosed in U.S. Pat. No. 4,052,481 in terms of the resin components present.

SUMMARY OF THE INVENTION

A first object of this invention is to increase the fire retardancy of a resin composition comprising an aromatic copolyester, a polyamide and a polyalkylene phenylene ester or a polyalkylene phenylene ester ether.

A second object of this invention is to render a resin composition comprising an aromatic copolyester, a polyamide and a polyalkylene phenylene ester or a polyalkylene phenylene ester ether fire retardant without deteriorating the superior moldability, mechanical properties, chemical properties, electrical properties and thermal stability of the composition.

These and other objects of the invention will become apparent from the following detailed description of the invention.

The present invention is based on the discovery that the addition of a specified amount of an aromatic halogen compound, preferably a halogenated diphenyl ether, can increase the fire retardancy of a resin composition comprising an aromatic copolyester derived from terephthalic acid and isophthalic acid and/or the function derivatives thereof and a bisphenol and/or the functional derivatives thereof, a polyamide, and a polyalkylene phenylene ester or a polyalkylene phenylene ester ether without deteriorating the superior moldability, mechanical properties, chemical properties, electrical properties and thermal stability of the resin composition, and that the effect of increasing the fire retardancy of the resin composition is enhanced by using the aromatic halogen compound in combination with a fire-retardant assistant.

According to one embodiment of the present invention, there is provided a fire-retardant resin composition comprising (A) 1 to 98.9% by weight of an aromatic copolyester (hereinafter referred to as "PPES", for brevity) comprising the reaction product in about equimolar amounts of
 (1) terephthalic acid and isophthalic acid and/or the functional derivatives thereof (the terephthalic acid unit/isophthalic acid unit molar ratio being about 9:1 to about 1:9) and
 (2) a bisphenol of the following general formula [I]:

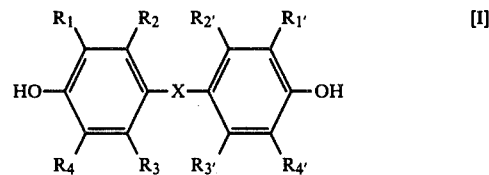

wherein —X— represents a member selected from the group consisting of —O—, —S—, —SO$_2$—, —SO—, —CO—, and alkylene and alkylidene groups containing 1 to 5 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, a bromine atom and an alkyl group containing 1 to 5 carbon atoms, or a derivative thereof;

(B) 1 to 98.9% by weight of a polyamide (hereinafter referred to as "PA", for brevity) containing therein a repeating unit of the following general formula [II];

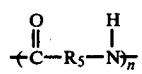  [II]

or

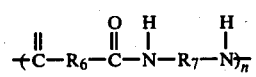  [III]

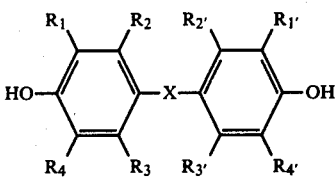  [I]

wherein —X— is selected from the group consisting of —O—, —S—, —SO$_2$—, —SO—, —CO—, an alkylene group containing 1 to 5 carbon atoms and an alkylidene group containing 1 to 5 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 5 carbon atoms, or a functional derivative thereof.

Suitable examples of alkylene groups for X containing 1 to 5 carbon atoms include a methylene group, an ethylene group, a propylene group, a tetramethylene group and a pentamethylene group. Suitable examples of alkylidene groups for X containing 1 to 5 carbon atoms include an ethylidene group, a propylidene group, an isopropylidene group, an isobutylidene group and a pentylidene group.

Suitable examples of alkyl groups for $R_1$ to $R_4$ and $R_1'$ to $R_4'$ containing 1 to 5 carbon atoms include a methyl group, an ethyl group, an isopropyl group, a tert-butyl group and a neopentyl group.

wherein $R_5$, $R_6$ and $R_7$, which may be the same or different, each represents an alkylene group containing 4 to 11 carbon atoms and n is an integer of from 30 to 500, and (C) 0.1 to 98% by weight of a polyalkylene phenylene ester (hereinafter referred to as "PES", for brevity) or a polyalkylene phenylene ester ether (hereinafter referred to as "PEES", for brevity) containing therein the repeating unit of the following general formula [IV];

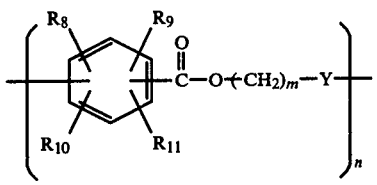  [IV]

wherein $R_8$, $R_9$, $R_{10}$ and $R_{11}$, which may be the same or different, each is selected from the group consisting of a hydrogen atom, a chlorine atom, a bromine atom and an alkyl group containing 1 to 5 carbon atoms, m is an integer from 1 to 10 and n is an integer from 30 to 500, and Y is an ester unit or an ether unit; and (D) 0.5 to 50% by weight, based on the total amount of components (A), (B), (C) and (D), of an aromatic halogen compound.

In a second embodiment of this invention, there is provided a flame-retardant resin composition comprising components (A), (B), (C) and (D) as described above and in the proportions described above; and additionally (E) 5 to 50% by weight, based on the weight of component (D), of a fire retardant assistant.

DETAILED DESCRIPTION OF THE INVENTION

In the resin composition as described above the amount of each of (A), (B) and (C) is expressed in % by weight based on the total amount of components (A), (B) and (C), and this basis is used throughout the present specification and the appended claims.

It is indeed surprising that the fire-retardant resin composition of this invention containing the specified aromatic halogen compound has very good fire retardancy, and all of the superior properties inherently possessed by the resin composition composed of components (A), (B) and (C) described above are retained.

The PPES used in this invention is obtained from a mixture of terephthalic acid and isophthalic acid and/or the functional derivatives thereof (the terephthalic acid unit/isophthalic acid unit molar ratio being about 9:1 to about 1:9) and a bisphenol of the following general formula [I]:

A mixture of about 90 to about 10 mole% of terephthalic acid and/or the functional derivatives thereof and about 10 to about 90 mole% of isophthalic acid and/or the functional derivatives thereof is used as an acid component to be reacted with the bisphenol to prepare the PPES used in this invention. Preferably, a mixture of 30 to 70 mole% of terephthalic acid and/or the functional derivatives thereof and 70 to 30 mole% of isophthalic acid and/or the functional derivatives thereof is used. PPES prepared from a bisphenol having the general formula [I](hereinafter simply "bisphenol" for brevity) and a mixture of 50 mol% of terephthalic acid and/or the functional derivatives thereof and 50 mol% of isophthalic acid and/or the functional derivatives thereof is most preferred. The molar ratio of the bisphenol to the sum of the terephthalic acid units and isophthalic acid units is substantially equimolar, e.g., about 1:1, preferably 1:1.

Examples of functional derivatives of terephthalic or isophthalic acid which can be used in this invention include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of these acids containing 1 to 6 (especially 1 to 2) carbon atoms in each alkyl moiety thereof. Preferred examples of diaryl esters include diphenyl terephthalate, and diphenyl isophthalate.

Examples of suitable bisphenols which can be used are 4,4'-dihydroxy-diphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4-hydroxyphenyl)ethane, 2,2-bis(4-hydroxy-3- methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. 2,2-bis(4-Hydroxyphenyl)propane, bisphenol A, is most typical, is easily available, and, accordingly, is most often used.

Typical examples of the functional derivatives of the bisphenol which can be used are the alkali metal salts and diesters thereof with aliphatic monocarboxylic acids containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters thereof. The bisphenol can be used either individually or as a mixture of two or more thereof.

To produce the aromatic copolyesters used in this invention, the interfacial polymerization method which comprises mixing a solution of an aromatic dicarboxylic acid chloride in a water-immiscible organic solvent which an alkaline aqueous solution of bisphenol, the solution polymerization method which comprises heating bisphenol and an acid chloride in an organic solvent, and the melt polymerization method which comprises heating a phenyl ester of an aromatic dicarboxylic acid and bisphenol, which are described in detail in U.S. Pat. No. 3,884,990, and 3,946,091, can, for example, be employed. The production of aromatic copolyesters is also described in detail in U.S. Pat. No. 4,052,481.

In order to insure the good physical properties of the aromatic copolyesters used in this invention, they should have a logarithmic viscosity number ($n_{inh}$), defined by the following equation, of about 0.3 to about 1.0, preferably 0.4 to 0.8.

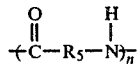

wherein $t_1$ is the falling time (in seconds) of a solution of the aromatic copolyester; $t_2$ is the falling time (in seconds) of the solvent; and C is the concentration (g/dl) of the aromatic copolyester in the solution. The logarithmic viscosity number used herein, is determined in a 1,1,2,2-tetrachloroethane-phenol mixture (weight ratio: 4/6) at 25° C.

The PA, one component of the resin composition of this invention, is a compound having therein a repeating unit represented by the following general formula [II]:

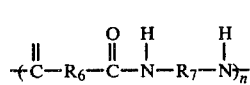

wherein $R_5$, $R_6$ and $R_7$, which may be the same or different, each represents an alkylene group having 4 to 11 carbon atoms, and n is an integer of 30 to 500.

Suitable examples of alkylene groups containing 4 to 11 carbon atoms for $R_5$ to $R_7$ include a tetramethylene group, a pentamethylene group, a hexamethylene group, a heptamethylene group, an octamethylene group, a nonamethylene group, a decamethylene group, and an undecamethylene group.

Any PA which contains a repeating unit represented by either of the above general formulae [II] and [III] can be used in this invention and there is no further limitation. Preferred examples of the PA include polyhexamethylene adipamide, polycaprolactam, polyhexamethylene sebacamide, polydecamethylene adipamide, polyaminoundecanoic acid, and polylaurolactum.

Copolyamides can also be used as the PA in this invention. Examples of suitable copolyamides include a copolyamide derived from caprolactam and hexamethylene adipamide, and a copolyamide derived from caprolactam and hexamethylene sebacamide.

The PES and PEES used in this invention are compounds which contain therein units represented by the following general formula [IV]:

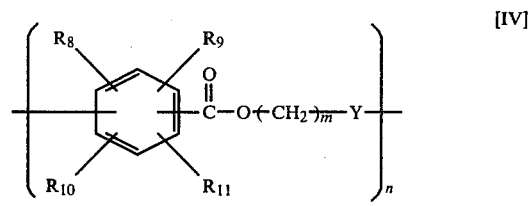

wherein $R_8$, $R_9$, $R_{10}$ and $R_{11}$, which may be the same or different, each represents a member selected from the group consisting of a hydrogen atom, a chlorine atom, a bromine atom and an alkyl group having 1 to 5 carbon atoms, m is an integer of 1 to 10, n is an integer of 30 to 500, and Y is an ester unit

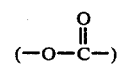

or an ether unit (—O—).

Suitable examples of alkyl groups containing 1 to 5 carbon atoms for $R_8$ to $R_{11}$ include a methyl group, an ethyl group, an isopropyl group, a tert-butyl group and a neopentyl group.

Suitable examples of the PES which can be used in this invention include polyethylene terephthalate, polyethylene isophthalate, polytrimethylene terephthalate, polytrimethylene isophthalate, polytetramethylene terephthalate, and polytetramethylene isophthalate, with polyethylene terephthalate and polytetramethylene terephthalate being preferred.

Suitable examples of the PEES which can be used in this invention include polyethylene-p-phenylene ester ether, polyethylene-m-phenylene ester ether, polytrimethylene-p-phenylene ester ether, polytrimethylene-m-phenylene ester ether, polytetramethylene-p-phenylene ester ether, and polytetramethylene-m-phenylene ester ether, with polyethylene-p-phenylene ester ether being preferred.

The resin composition of this invention is a quaternary composition comprising (A) PPES, (B) PA, (C) PES or PEES and (D) an aromatic halogen compound and thus the properties of the resin composition vary depending on the compounding ratio of the individual components. There is a tendency with increased PPES content for the thermal stability of the resin composition to be enhanced, that with an increased PA content, the resin composition has improved thermal resistance, moldability, and abrasion resistance, and that with an increased PES or PEES content the moldability of the composition is improved.

Crazing is observed with molded articles made from PPES alone when they are left to stand in hot water or steam, resulting in a marked reduction in their mechanical properties such as impact strength. The occurrence of crazing can effectively be prevented by the addition of PES or PEES to the PPES. Therefore, freedom from crazing is observed with the copolyester resin composition used in this invention.

The amount of PES or PEES sufficient to prevent the occurrence of crazing is at least about 0.1% by weight. The aromatic copolyester resin composition used in this invention should contain PPES and PA each in an amount of 1% by weight or more from the standpoint of thermal stability, chemical resistance, moldability and abrasion resistance and, therefore, the resin composition used in this invention comprises (A) 1 to 98.9% by weight of PPES, (B) 1 to 98.9% by weight of PA, and (C) 0.1 to 98% by weight of PES or PEES.

The resin composition used in this invention exhibits excellent mechanical, chemical, electrical and thermal properties over a wide range of compounding ratios. In order to obtain good moldability, chemical resistance, thermal stability and mechanical properties, it is preferred for the resin composition to contain PPES in an amount of 10 to 89.9% by weight, PA in an amount of 10 to 89.9% by weight and PES or PEES in an amount of 0.1 to 80% by weight. A more preferred amount of the PPES, the PA and the PES or PEES is 15 to 84.9% by weight, 15 to 84.9% by weight and 0.1 to 70% by weight, respectively.

Especially good mechanical properties are obtained with a composition comprising 15 to 80% by weight of PPES, 15 to 80% by weight of PA and 5 to 70% by weight of PES or PEES. Further, especially good thermal stability is obtained with a composition of 15 to 84.9% by weight of PPES, 15 to 84.9% by weight of PA and 0.1 to less than 5% by weight of PES or PEES, most preferably, 30 to 69.9% by weight of PPES, 30 to 69.9% by weight of PA and 0.1 to less than 40% by weight of PES or PEES.

In the present invention, an aromatic halogen compound (D) is used as a fire retardant to achieve fire retardancy. Suitable aromatic halogen compounds are stable at temperatures, e.g., about 200° to about 300° C., more generally about 220° to about 280° C., normally used to process the resin composition comprising components (A), (B) and (C) in the molten state, yet decompose at the burning temperature of the resin composition. Examples of such aromatic halogen compounds are those of the general formulae [V] to [IX] given below.

Compounds of the general formula [V]

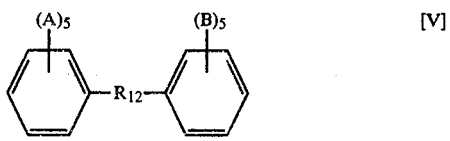

wherein A and B, which may be the same or different, each represents a hydrogen atom, a chlorine atom or a bromine atom and at least one of each of A and B is a bromine atom or a chlorine atom, and $R_{12}$ represents —O—, —S—, —SO$_2$—, an alkylene group containing 1 to 5 carbon atoms or an alkylidene group containing 1 to 5 carbon atoms, each of which may be partially halogenated or each of which may contain at least one ether linkage in the chain thereof. Suitable examples of alkylene groups having 1 to 5 carbon atoms and alkylidene groups containing 1 to 5 carbon atoms are as described hereinbefore for X.

Of the compounds of formula [V], halogenated diphenyl ethers especially have superior thermal stability, and serve to maintain the dynamic strength of extruded or injection molded products of the fire-retardant resin composition of this invention at a high level. Decabromodiphenyl ether having a high halogen content has been found to be most suitable for increasing the fire-retardancy of the above resin composition since decabromodiphenyl ether serves to maintain the mechanical strengths of the resin composition at high levels and has a very great effect in imparting fire retardancy.

It has been found also that by adjusting the total amount of the halogenated diphenyl ether and an antimony compound (described hereinafter) as a fire-retardant assistant to 1 to 30% by weight based on the total amount of the resin composition [the total of components (A), (B), (C), (D) and (E)], the dynamic strength of the resin composition of the second embodiment of this invention is maintained at the highest level and the composition concurrently has superior fire retardancy.

Other specific examples of the halogenated diphenyl ethers which can be used include octabromodiphenyl ether, hexabromodiphenyl ether, pentabromodiphenyl ether, tetrabromodiphenyl ether, tribromodiphenyl ether, dibromodiphenyl ether, monobromodiphenyl ether, decachlorodiphenyl ether, octachlorodiphenyl ether, hexachlorodiphenyl ether, pentachlorodiphenyl ether, tetrachlorodiphenyl ether, trichlorodiphenyl ether, dichlorodiphenyl ether, and monochlorodiphenyl ether. Where any position isomers of these compounds exist, any and all position isomers are included within the scope of the above recited compounds and can be suitably employed in this invention (hereinafter the same).

Other compounds represented by general formula [V] are, for example, decabromodiphenyl sulfide, octabromodiphenyl sulfide, tetrachlorodiphenyl sulfide, tetrachlorodiphenyl sulfone, 3,5-dichloro-3',5'-dibromodiphenyl sulfone, 2,4-dichloro-3',4',5'-tribromodiphenylmethane, decachlorodiphenyl sulfone, decabromodiphenyl sulfone, bis(tribromophenoxy)methylene, bis(tribromophenoxy)ethylene, and bis(pentabromophenoxy)ethylene.

Compounds of the general formula [VI]

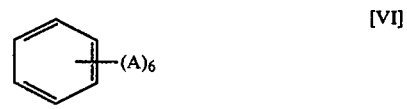

wherein A represents a hydrogen atom, a chlorine atom or a bromine atom and at least one A, preferably at least two A's, represent a chlorine atom or a bromine atom.

Examples of compounds of general formula [VI] which can be used are hexabromobenzene, hexachlorobenzene, tetrabromobenzene, tetrachlorobenzene, tribromobenzene and trichlorobenzene. Hexabromobenzene and hexachlorobenzene are especially suitable because they provide superior thermal stability and a high halogen content.

Compounds of the general formula [VII]

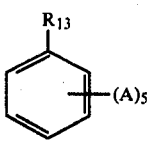

wherein A represents a hydrogen atom, a chlorine atom or a bromine atom, and at least one A, preferably at least two A's, represent a chlorine atom or a bromine atom, and $R_{13}$ represents an alkyl group containing 1 to 5 carbon atoms or an alkenyl group containing 1 to 5 carbon atoms, each of which may be partially halogenated or each of which may contain at least one ether linkage in the chain. Suitable examples of alkyl groups containing 1 to 5 carbon atoms are as described hereinbefore for $R_1$ to $R_4$ and $R_1'$ to $R_4'$ and suitable examples of alkenyl groups containing 1 to 5 carbon atoms are an allyl group and a methallyl group.

Examples of compounds of formula [VII] which can be used are pentabromotoluene, pentachlorotoluene, pentabromoethylbenzene, pentabromophenyl allyl ether, 2,4,6-tribromophenyl methallyl ether, and 2,4,6-tribromophenyl-2-methyl-2,3-dibromopropyl ether. Pentabromotoluene and pentabromoethylbenzene are especially suitable.

Compounds of the general formula [VIII]

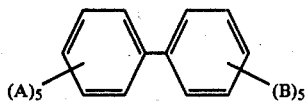

wherein A and B, which may be the same or different, each represents a hydrogen atom, a chlorine atom or a bromine atom, and at least one of each of A and B is a bromine atom or a chlorine atom.

Examples of compounds of formula [VIII] which can be used are hexachlorodiphenyl, hexabromodiphenyl, octabromodiphenyl, octachlorodiphenyl, decabromodiphenyl, and decachlorodiphenyl. Decabromodiphenyl and octabromodiphenyl are especially suitable.

Compounds of the general formula [IX]

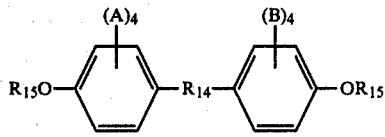

wherein A and B, which may be the same or different, each represents a hydrogen atom, a chlorine atom or a bromine atom and at least one of each of A and B is a bromine atom or a chlorine atom, $R_{14}$ represents —O—, —S—, —SO$_2$—, —CO—, an alkylene group containing 1 to 5 carbon atoms or an alkylidene group containing 1 to 5 carbon atoms, and $R_{15}$ represents a hydrogen atom, an alkyl group containing 1 to 5 carbon atoms or a hydroxy alkyl group, containing 1 to 5 carbon atoms each of which may be partially halogenated, and each of which may contain at least one ether linkage in the chain thereof. Suitable examples of alkylene groups containing 1 to 5 carbon atoms and alkylidene groups containing 1 to 5 carbon atoms for $R_{14}$ are as described hereinbefore for X. Suitable examples of alkyl groups for $R_{15}$ are as described hereinbefore for $R_1$ to $R_4$ and $R_1'$ to $R_4'$ and suitable examples of hydroxyalkyl groups for $R_{15}$ are a hydroxymethyl group, a 2-hydroxyethyl group, a 3-hydroxypropyl group, a 4-hydroxybutyl group, a 5-hydroxypentyl group or the like.

Examples of compounds of formula [IX] which can be used include 2,2-bis(4-hydroxy-3,5-dibromophenyl)propane, 2,2-bis(4-hydroxyethoxy-3,5-dibromophenyl)propane, 2,2-bis[4(2',3'-dibromopropoxy)-3,5-dibromophenyl]propane, bis(4-hydroxy-3,5-dibromophenyl)sulfone, 2,2-bis(4-ethoxy-3,5-dichlorophenyl)propane, bis(4-hydroxy-3,5-dichlorophenyl)-sulfone, and 2,2-bis(4-ethoxy-3,5-dibromophenyl)propane. 2,2-bis(4-Hydroxyethoxy-3,5-dibromophenyl)propane and bis(4-hydroxy-3,5-dibromophenyl)sulfone are especially suitable.

The aromatic halogen compounds may be used individually or as mixtures of two or more thereof.

In making the resin composition comprising (A) the aromatic copolyester, (B) the polyamide and (C) the polyalkylene phenylene ester or the polyalkylene phenylene ester ether fire-retardant, the amount of the aromatic halogen compound (D) to be incorporated is 0.5 to 50% by weight, preferably 1 to 30% by weight, based on the total amount of components (A), (B), (C) and (D). When the amount of the aromatic halogen compound (D) is within the above-specified range, the resulting fire-retardant resin composition retains quite well the superior mechanical properties inherently possessed by the above resin composition.

Examples of fire-retardant assistants which can be used in this invention as component (E) are antimony compounds, zinc borate, barium metaborate, hydrated alumina, zirconium oxide, ammonium polyphosphate, etc. Of these, the antimony compounds are especially suitable because they have the greatest synergistic effect when used with the aromatic halogen compound (D). Specific examples of suitable antimony compounds which can be used as component (E) are sulfides of antimony such as $Sb_2S_3$ and $Sb_2S_5$, and salts formed between antimony and alkali metals of Group I of the Periodic Table such as $K_3Sb$, $Na_3Sb$ and $Li_3Sb$, and antimony trioxide. Antimony trioxide is most typical. These fire-retardant assistants can be used either individually or as mixtures of two or more thereof.

The combined use of the fire-retardant assistant (E) and the aromatic halogen compound (D) with components (A), (B) and (C) described above results in a resin composition having very good fire retardancy.

The amount of the fire-retardant assistant (E) to be incorporated in the fire-retardant resin composition is 5 to 50% by weight based on the amount of the aromatic halogen compound (D).

To incorporate the aromatic halogen compound (D) and the fire-retardant assistant (E), if such is employed, in the resin composition composed of components (A), (B) and (C), usually pellets of the resin composition containing the aromatic halogen compound (D) and the fire-retardant assistant (E), if such is employed, are formed and molded articles are produced from such pellets. Alternatively, it is possible to blend the aromatic halogen compound (D) and the fire-retardant assistant (E), if such is employed, with pellets of the resin composition composed of components (A), (B) and (C), and to form molded articles from the blend.

If desired, to improve the thermal stability of the resin composition of this invention, various thermal stabilizers such as metallic compounds, phosphorus compounds, hindered phenols can be added thereto. When cuprous chloride (or cuprous iodide) and 2-mercaptobenzimidazole are added together to the resin, the most improved thermal stability is obtained. Usually the thermal stabilizers are used in an amount of about 0.01 to about 5% by weight based on the weight of the fire retardant resin composition.

Various weather resisting agents can be added to the resin composition of this invention to improve the weatherability thereof. Examples of suitable weather resisting agents include benzotriazole derivatives, benzophenone derivatives. Particularly preferred examples of these compounds are 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, etc. Usually the weather resisting agent is used in an amount of about 0.01 to about 5% by weight based on the weight of the fire retardant resin composition.

A phosphorus compound such as an orthophosphoric acid ester, an acid orthophosphoric acid ester, orthophosphoric acid, a phosphorous acid ester, an acid phosphorous acid ester or phosphorous acid, when added in an amount of 0.01 to 0.5% by weight based on the total weight of the fire-retardant resin composition, produces good results as a coloration inhibitor. The phosphorus compound may be used in combination with an epoxy compound, a compound composed of an organic carboxylic acid and an alkali metal, or a compound composed of an organic carboxylic acid and an alkaline earth metal. Representative examples of the epoxy compounds which can be used are 1,2,3,4-diepoxybutane and the diglycidil ether of bisphenol A, representative examples of the organic carboxylic acids which can be employed are acetic acid and stearic acid, representative examples of the alkali metal salts of organic carboxylic acids which are suitable are sodium acetate and potassium stearate, and representative examples of the alkaline earth metal salts of organic carboxylic acids which can be utilized are calcium maleate and magnesium stearate, all being added in an amount of about 0.01 to about 5% by weight based on the total weight of the fire retardant resin composition.

Further, if desired, ordinary reinforcing fillers, such as glass fibers, inorganic silicates, silica, quartz, silica gel, carbon fibers, cristobalite, asbestos, clay or talc, may be incorporated in the fire-retardant resin composition of this invention. A suitable amount of these reinforcing fillers ranges from about 1 to about 50% by weight based on the weight of the fire retardant resin composition.

Furthermore, in order to further improve the mechanical properties, such as impact strength or elongation at break, of the fire-retardant resin composition of this invention, it is possible to add a rubber such as acrylonitrile-butadiene rubber or styrene-butadiene rubber, an acrylonitrile/butadiene/styrene (ABS) resin, a polycarbonate, polyethylene, polypropylene, a polyurethane, polystyrene, EVA copolymers, poly(acrylates), polytetrafluoroethylene, or poly(methyl methacrylate) to the resin composition. A suitable amount of these rubbers or polymer materials which can be used is about 1 to about 30% by weight, preferably about 1 to about 10% by weight based on the weight of the fire-retardant resin composition.

The fire-retardant resin composition of this invention can be used in the form of powders, chips, etc., which can be molded into various useful molded articles by compression molding, injection molding, extrusion molding and the like using conventional molding processes. Examples of molded articles which can be produced include gears, bearings, electrical component parts, containers and various other articles which are used widely in those fields where engineering plastics of high quality are required.

The following examples are given to illustrate this invention in greater detail. These examples should be considered, however, as merely exemplary and non-limiting. Unless otherwise indicated herein, all parts, percents, ratios and the like are by weight.

EXAMPLES 1 TO 17 AND COMPARATIVE EXAMPLES 1 AND 2

A methylene chloride solution (292 kg) of 10 kg of terephthaloyl dichloride and 10 kg of isophthaloyl dichloride was mixed with 450 kg of an aqueous sodium hydroxide solution of 23 kg of bisphenol A, and an aromatic copolyester was produced using an interfacial polymerization method. The copolyester had a logarithmic viscosity number $[\eta_{inh}]$, determined at 25° C. in a phenol/tetrachloroethane mixture (weight ratio 6:4) in a concentration of 1 g/dl, of 0.65.

The resulting aromatic copolyester was mixed with polyethylene terephthalate (a product of Nippon Ester Kabushiki Kaisha; having a logarithmic viscosity number, determined in a 6:4 (by weight) mixture of phenol/tetrachloroethane at 25° C. in a concentration of 1 g/dl, of 0.60) in the amounts indicated in Table 1 below. The mixture was dried at 100° C. for 16 hours, and extruded through an extruder at 300° C. (for Sample No. 1), or at 280° C. (for Sample No. 2), and cut to form pellets designated as Samples Nos. 1 and 2. Each of the pellets was mixed with polycaprolactam (a product of Unitika, Ltd.; having a logarithmic viscosity number, determined at 25° C. in a 6:4 (by weight) mixture of phenol/tetrachloroethane in a concentration of 1 g/dl, of 1.01). The mixture was dried at 100° C. for 16 hours, and then extruded at 280° C. using an extruder to form pellets of the compositions shown in Table 1 below as Samples Nos. 3 and 4.

Table 1

| Sample No. | Composition (parts by weight) | | | Example |
|---|---|---|---|---|
| | Aromatic Copolyester | Polyethylene Terephthalate | Polycaprolactam | |
| 1 | 97 | 3 | — | — |
| 2 | 70 | 30 | — | — |
| 3 | 58.2 | 1.8 | 40 | Comparative Example 1 |
| 4 | 49 | 21 | 30 | Comparative Example 2 |

The pellets of Samples Nos. 3 and 4 were dried at 100° C. for 8 hours, and then molded using an injection molding machine while maintaining the cylinder temperature at 270° C. and the die temperature at 60° C. to form burning test pieces for evaluation of flammability (hereinafter "burning test pieces") having a length of 5 inches, a width of 0.5 inch and a thickness of 1/16 inch or 1/32 inch. These test pieces were subjected to burning testing in accordance with Underwriters Laboratories Subject 94. It was found that both of Samples Nos. 3 and 4 completely burned, and did not have any self-extinguishing properties (Comparative Examples 1 and 2).

The pellets of Sample No. 3 were mixed with each of the fire retardants and fire-retardant assistants shown in Table 2 below in the amounts indicated in Table 2 below. The mixture was dried at 100° C. for 8 hours, and extruded using an extruder at 220° C. to form pellets. The resulting pellets were dried at 100° C. for 8 hours, and then molded using an injection molding machine with the cylinder temperature at 250° C. and the die temperature at 60° C. to form test pieces having a length of 5 inches, a width of 0.5 inch and a thickness of 1/16 inch. The test pieces were subjected to burning testing in accordance with Underwriters Laboratories Subject 94 to measure their burning times. The results obtained are shown in Table 2 below.

Each of the pellets of Samples Nos. 6, 8, 12, 14 and 19 obtained in Examples 2, 4, 8, 10 and 15, and Sample No. 3 (Comparative Example 1) was dried at 100° C. for 8 hours, and then formed using an injection molding machine into tensile strength test pieces, bending strength test pieces, heat distortion test pieces, Izod impact test pieces, and 1/16 inch burning test pieces in accordance with the standards of ASTM D-638, D-790, D-648, D-256, and UL-94, respectively. The properties of these test pieces were measured, and the results obtained are shown in Table 3 below.

Table 3

| Mechanical Properties | Sample No. | | | | | |
|---|---|---|---|---|---|---|
| | 3 | 6 | 8 | 12 | 14 | 19 |
| Tensile Strength (kg/cm$^2$) | 650 | 670 | 660 | 670 | 670 | 700 |
| Elongation at Break (%) | 75 | 68 | 46 | 51 | 53 | 35 |
| Flexural Yield Strength (kg/cm$^2$) | 800 | 810 | 810 | 810 | 820 | 860 |
| Flexural Modulus (10$^3$ kg/cm$^2$) | 15 | 17 | 18 | 18 | 17 | 21 |
| Izod Impact Strength (1/8", kg · cm/cm) | 22 | 20 | 9 | 12 | 15 | 5 |
| Heat Distortion Temperature (°C.) | 150 | 152 | 151 | 152 | 151 | 153 |
| Burning Property (1/6") (average burning time (seconds), 1st/2nd) | slow burning | 0/0 | 1/1 | 0/0 | 1/1 | 2/0 |
| UL-94 Rank | HB | V-O | V-O | V-O | V-O | V-O |
| | Comparative Example 1 | Example 2 | Example 4 | Example 8 | Example 10 | Example 15 |

As shown by the results in Table 3 above, the fire

Table 2

| Sample No. | Sample No. 3 Pellets (parts by weight) | Aromatic Halogen Compound Type | Amount (parts by weight) | Fire-Retardant Assistant Type | Amount (parts by weight) | Average Burning Time (sec.) | Example |
|---|---|---|---|---|---|---|---|
| 5 | 85 | DBDE | 15 | — | None | 2 | 1 |
| 6 | 87 | DBDE | 10 | Sb$_2$O$_3$ | 3 | 0 | 2 |
| 7 | 85 | HBB | 15 | — | None | 6 | 3 |
| 8 | 80 | HBB | 15 | Sb$_2$O$_3$ | 5 | 1 | 4 |
| 9 | 85 | PBT | 15 | — | None | 6 | 5 |
| 10 | 80 | PBT | 15 | Sb$_2$O$_3$ | 5 | 1 | 6 |
| 11 | 85 | DBS | 15 | — | None | 3 | 7 |
| 12 | 80 | DBS | 15 | Sb$_2$O$_3$ | 5 | 0 | 8 |
| 13 | 85 | DBB | 15 | — | None | 3 | 9 |
| 14 | 84 | DBB | 12 | Sb$_2$O$_3$ | 4 | 1 | 10 |
| 15 | 85 | TBA | 15 | — | None | 7 | 11 |
| 16 | 80 | TBA | 15 | Sb$_2$O$_3$ | 5 | 4 | 12 |
| 17 | 85 | TBA-EQ | 15 | — | None | 5 | 13 |
| 18 | 85 | OCS | 15 | — | None | 8 | 14 |
| 19 | 60 | TBA | 30 | Sb$_2$O$_3$ | 10 | 1 | 15 |
| 20 | 82 | DBDE | 13 | ZB | 5 | 1 | 16 |
| 21 | 73 | PBE | 20 | Sb$_2$O$_3$ | 7 | 2 | 17 |

Note
DBDE: Decabromodiphenyl ether
HBB: Hexabromobenzene
PBT: Pentabromotoluene
DBS: Decabromodiphenylsulfone
DBB: Decabromobiphenyl
TBA: Tetrabromobisphenol A
TBA-EO: 2,2-bis(4-Hydroxyethoxy-3,5-dibromophenyl)-propane
OCS: Octachlorodiphenylsulfone
PBE: Pentabromoethylbenzene
Sb$_2$O$_3$: Antimony trioxide
ZB: Zinc borate It can be seen from the results in Table 2 above that the fire-retardant compositions of this invention have superior fire retardancy.

retarding resin compositions of this invention have superior mechanical properties and fire retardancy.

EXAMPLES 18 TO 21

The pellets of Samples Nos. 3 and 4 shown in Table 1 above were each mixed with decabromodiphenyl ether and antimony trioxides in the amounts shown in Table 4 below. The mixture was dried at 100° C. for 6 hours, and extruded at 220° C. through an extruder to form pellets designated as Samples Nos. 22, 23, 24 and 25.

Table 4

| Sample No. | Mixing Ratio (parts by weight) | | | |
|---|---|---|---|---|
| | Sample No. 3 | Sample No. 4 | Decabromo-diphenyl Ether | Antimony Trioxide |
| 22 | 96.4 | — | 3 | 0.6 |
| 23 | 87 | — | 10 | 3 |
| 24 | — | 96.4 | 3 | 0.6 |
| 25 | — | 87 | 10 | 3 |

These pellets of Samples Nos. 3, 4, 22, 23, 24 and 25 were each dried at 100° C. for 6 hours, and then molded using an injection molding machine while maintaining the cylinder temperature at 250° C. and the die temperature at 60° C. to form test pieces having a length of 5 inches, a width of 0.5 inch and a thickness of 1/16 inch or 1/32 inch. The test pieces were subjected to burning testing in accordance with Underwriters Laboratories Subject 94. The results obtained are shown in Table 5 below.

Table 5

| Sample No. | Thickness (inch) | Average Burning Time (seconds) | UL Rank | Example No. |
|---|---|---|---|---|
| 3 | 1/16 | Burned up | 94 HB | Comparative |
| | 1/32 | " | 94 HB | Example 1 |
| 4 | 1/16 | " | 94 HB | Comparative |
| | 1/32 | " | 94 HB | Example 2 |
| 22 | 1/16 | 3.6 | 94 V-2 | |
| | 1/32 | 4.8 | 94 V-2 | Example 18 |
| 23 | 1/16 | 0 | 94 V-0 | |
| | 1/32 | 0 | 94 V-0 | Example 19 |
| 24 | 1/16 | 4.5 | 94 V-2 | |
| | 1/32 | 5.1 | 94 V-2 | Example 20 |
| 25 | 1/16 | 1.0 | 94 V-0 | |
| | 1/32 | 1.0 | 94 V-0 | |

The results given in Table 5 above show that, in combination with antimony trioxide, decabromodiphenyl ether in small amounts provides a very high level of fire retardancy of the resin composition.

The pellets of Samples Nos. 3, 4, 22, 23, 24 and 25 were dried at 100° C. for 6 hours, and molded using an injection molding machine while maintaining the cylinder temperature at 250° C. and the die temperature at 60° C. to form dumbbell-shaped test pieces and tensile impact test pieces. Using the resulting test pieces, tensile strength testing and tensile impact testing were performed. The results obtained are shown in Table 6 below.

Table 6

| Sample No. | Tensile Strength (kg/cm$^2$) | Young's Modulus (kg/cm$^2$) | Tensile Impact Value (kg . cm/cm) | Example No. |
|---|---|---|---|---|
| 3 | 650 | 23000 | 280 | Comparative Example 1 |
| 4 | 580 | 21000 | 250 | Comparative Example 2 |
| 22 | 660 | 24000 | 250 | Example 18 |
| 23 | 670 | 25000 | 200 | Example 19 |
| 24 | 640 | 26000 | 230 | Example 20 |
| 25 | 650 | 27000 | 190 | Example 21 |

It can be seen from the results given in Table 6 above that the fire-retardant resin compositions of this invention have superior mechanical properties.

EXAMPLES 22 TO 24 AND COMPARATIVE EXAMPLES 3 TO 5

The aromatic copolyester (A) produced as described in Examples 1 to 17 (58.2 parts by weight) was mixed with 40 parts by weight of a polyamide (B) and 1.8 parts by weight of a polyalkylene phenylene ester or a polyalkylene phenylene ester ether (C) as shown in Table 7 below to form Samples Nos. 26, 27 and 28. Each of the pellets was mixed with 10% by weight, based on the weight of (A)+(B)+(C)+(D), of decabromodiphenyl ether (D) and 3% by weight, based on the weight of (A)+(B)+(C)+(D)+(E), of antimony trioxide (E) to produce Samples Nos. 29, 30 and 31. Samples Nos. 26, 27 and 28 were each extruded at 280° C. using an extruder. Samples Nos. 29, 30 and 31 were each mixed with decabromodiphenyl ether (D) and antimony trioxide (E) in the proportions shown above, dried at 100° C. for 6 hours, and extruded at 220° C. through an extruder.

The various pellets obtained were dried at 100° C. for 8 hours, and molded using an injection molding machine to form tensile strength test pieces, bending strength test pieces, heat distortion test pieces, Izod impact test pieces and 1/16 inch burning test pieces in accordance with ASTM D-638, D-790, D-648, D-256 and UL-84 standards. The properties were measured, and the results obtained are shown in Table 8 below.

Table 7

| Sample No. | Aromatic Copoly-ester | Poly-alkylene Phenylene Ester or Polyalkyl-ene Phenyl-ene Ester Ether | Poly-amide | Fire re-tardant | Fire re-tardant Assistant | Example No. |
|---|---|---|---|---|---|---|
| 26 | PPS | PET | PHMA | — | — | Comparative Example 3 |
| 27 | PPS | PBT | PA | — | — | Comparative Example 4 |
| 28 | PPS | PEP | PA | — | — | Comparative Example 5 |
| 29 | PPS | PET | PHHA | DBDE | Sb$_2$O$_3$ | Example 22 |
| 30 | PPS | PBT | PA | DBDE | Sb$_2$O$_3$ | Example 23 |

Table 7-continued

| Sample No. | Aromatic Copolyester | Polyalkylene Phenylene Ester or Polyalkylene Phenylene Ester Ether | Polyamide | Fire retardant | Fire retardant Assistant | Example No. |
|---|---|---|---|---|---|---|
| 31 | PPS | PEP | PA | DBDE | Sb$_2$O$_3$ | Example 24 |

Note
PPS: Aromatic copolyester of Example 1
PET: Polyethylene terephthalate ($\eta_{inh}$ 0.60)
PBT: Polybutylene terephthalate ($\eta_{inh}$ 0.56)
PEP: Polyethylene-p-phenylene ester ether ($\eta_{inh}$ 0.60)
PA: Poly caprolactam ($\eta_{inh}$ 1.10)
PHMA: Polyhexamethylene adipamide ($\eta_{inh}$ 1.20)

Table 8

| Mechanical Properties | Sample No. | | | | | |
|---|---|---|---|---|---|---|
| | 26 | 27 | 28 | 29 | 30 | 31 |
| Tensile Strength (kg/cm$^2$) | 660 | 640 | 640 | 680 | 650 | 650 |
| Elongation at Break (%) | 80 | 72 | 75 | 70 | 66 | 70 |
| Flexural Yield Strength (kg/cm$^2$) | 820 | 790 | 800 | 830 | 800 | 820 |
| Flexural Modulus (10$^3$ kg/cm$^2$) | 15 | 15 | 15 | 18 | 17 | 17 |
| Izod Impact Strength ($\frac{1}{8}$") (kg . cm/cm) | 24 | 21 | 22 | 22 | 20 | 20 |
| Heat Distortion Temperature (°C.) | 150 | 150 | 150 | 150 | 150 | 150 |
| Burning Property Average Burning Time (seconds) 1st/2nd | Slow burning | Slow burning | Slow burning | 0/0 | 0/0 | 0/0 |
| UL Rank | HB | HB | HB | V-0 | V-0 | V-0 |

As shown by the results in Table 8 above, the fire retardancy of the resin compositions of the present invention is remarkably improved and also the resin compositions of this invention have excellent mechanical properties as compared with the results obtained in the Comparative Examples.

While the invention has been described in detail and with reference to specific embodiments thereof, it will be apparent to one skilled in the art that various changes and modifications can be made therein without departing from the spirit and scope thereof.

What is claimed is:

1. A fire-retardant resin composition comprising
(A) 1 to 98.9% by weight of an aromatic copolyester comprising the reaction product in about equimolar amounts of
  (1) a mixture of terephthalic acid and isophthalic acid or the functional derivatives thereof with the terephthalic acid unit to the isophthalic acid unit molar ratio being about 9:1 to about 1:9 and
  (2) a bisphenol of the general formula [I]

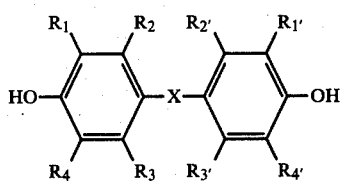

wherein —X— represents a member selected from the group consisting of —O—, —S—, —SO$_2$—, —SO—, —CO—, an alkylene group containing 1 to 5 carbon atoms and an alkylidene group containing 1 to 5 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, a bromine atom and an alkyl group containing 1 to 5 carbon atoms, or a derivative thereof.

(B) 1 to 98.9% by weight of a polyamide containing therein a repeating unit of the following general formula [II]:

or

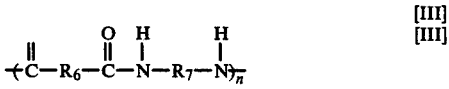

wherein R$_5$, R$_6$ and R$_7$, which may be the same or different, each represents an alkylene group containing 4 to 11 carbon atoms and n is an integer of from 30 to 500, and (C) 0.1 to 98% by weight of a polyalkylene phenylene ester or a polyalkylene phenylene ester ether containing therein a repeating unit of the following general formula [IV];

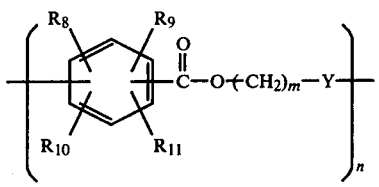

wherein $R_8$, $R_9$, $R_{10}$ and $R_{11}$, which may be the same or different, each is selected from the group consisting of a hydrogen atom, a chlorine atom, a bromine atom and an alkyl group containing 1 to 5 carbon atoms, m is an integer from 1 to 10 and n is an integer from 30 to 500, and Y is an ester unit or an ether unit; and (D) 0.5 to 50% by weight, based on the total amount of components (A), (B), (C) and (D), of an aromatic halogen compound.

2. The composition of claim 1, wherein the bisphenol of the general formula [I] is 2,2-bis(4-hydroxyphenyl)-propane.

3. The composition of claim 1, wherein the polyamide (B) is polycaprolactam.

4. The composition of claim 1, wherein the polyamide (B) is polyhexamethylene adipamide.

5. The composition of claim 1, wherein the polyalkylene phenylene ester or the polyalkylene phenylene ester ether (C) is polyethylene terephthalate.

6. The composition of claim 1, wherein the polyalkylene phenylene ester or the polyalkylene phenylene ester ether (C) is polytetramethylene terephthalate.

7. The composition of claim 1, wherein the polyalkylene phenylene ester or the polyalkylene phenylene ester ether (C) is a polyethylene-p-phenylene ester ether.

8. The composition of claim 1, wherein the aromatic halogen compound (D) is a compound of the formula [V]:

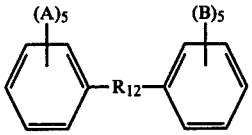

wherein A and B, which may be the same or different, each represents a hydrogen atom, a bromine atom or a chlorine atom, and at least one of each of A and B is a bromine atom or a chlorine atom, $R_{12}$ is —O—, —S—, —SO$_2$—, an alkylene group containing 1 to 5 carbon atoms or an alkylidene group containing 1 to 5 carbon atoms, each of which may be partially halogenated, and each of which may contain at least one ether linkage in the chain thereof.

9. The composition of claim 8, wherein the compound of the formula [V] is a halogenated diphenyl ether.

10. The composition of claim 9, wherein the halogenated diphenyl ether is decabromodiphenyl ether.

11. The composition of claim 1, wherein the aromatic halogen compound (D) is a compound of the general formula [VI];

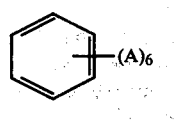

wherein A represents a hydrogen atom, a bromine atom or a chlorine atom, at least one A is a bromine atom or a chlorine atom and wherein the A's may be the same or different.

12. The composition of claim 11, wherein the compound of the formula [VI] is hexabromobenzene.

13. The composition of claim 1, wherein the aromatic halogen compound (D) is a compound of the formula [VII];

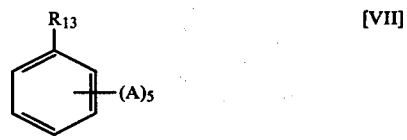

wherein A represents a hydrogen atom, a bromine atom or a chlorine atom, at least one A is a bromine atom or a chlorine atom and the A's may be the same or different, and $R_{13}$ is an alkyl group having 1 to 5 carbon atoms or an alkenyl group having 1 to 5 carbon atoms, each of which may be partially halogenated, and each of which may contain at least one ether linkage in the chain thereof.

14. The composition of claim 13, wherein the compound of the formula [VII] is pentabromotoluene.

15. The composition of claim 13, wherein the compound of the formula [VII] is pentabromoethylbenzene.

16. The composition of claim 1, wherein the aromatic halogen compound (D) is a compound of the formula [VIII]

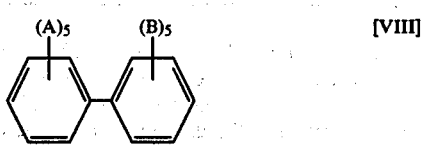

wherein A and B, which may be the same or different, each represents a hydrogen atom, a bromine atom or a chlorine atom and at least one of each of A and B is a bromine atom or a chlorine atom.

17. The composition of claim 16, wherein the compound of the formula [VIII] is decabromodiphenyl.

18. The composition of claim 1, wherein the aromatic halogen compound (D) is a compound of the formula [IX]

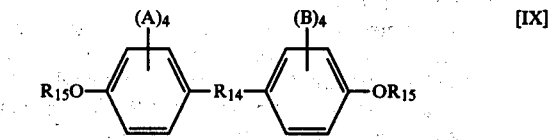

wherein A and B, which may be the same or different, each represents a hydrogen atom, a bromine atom or a chlorine atom and at least one of each of A and B is a bromine atom or a chlorine atom, $R_{14}$ represents —O—, —S—, —SO$_2$—, —CO—, an alkylene group containing 1 to 5 carbon atoms or an alkylidene group containing 1 to 5 carbon atoms, and $R_{15}$ represents a hydrogen atom, an alkyl group containing 1 to 5 carbon atoms or a hydroxyalkyl group containing 1 to 5 carbon atoms, each of which may partially be halogenated, and each of which may contain at least one ether linkage in the chain thereof.

19. The composition of claim 18, wherein the compound of the formula [IX] is 2,2-bis(4-hydroxyethoxy-3,5-dibromophenyl)propane.

20. The composition of claim 1, wherein the proportion of the aromatic halogen compound (D) is 1 to 30% by weight.

21. The composition of claim 1, wherein said resin composition additionally contains
(E) 5 to 50% by weight, based on the amount of the aromatic halogen compound (D), of a fire-retardant assistant.

22. The composition of claim 21, wherein the aromatic halogen compound (D) is a halogenated diphenyl ether and the fire-retardant assistant (E) is an antimony compound.

23. The composition of claim 22, wherein the total amount of the halogenated diphenyl ether and the antimony compound is 1 to 30% by weight based on the total amount of components (A), (B), (C), (D) and (E).

24. The composition of claim 22, wherein the halogenated diphenyl ether (D) is decabromodiphenyl ether.

25. The composition of claim 22, wherein the antimony compound (E) is antimony trioxide.

26. The composition of claim 21, wherein the fire retardant assistant (E) is an antimony compound.

27. The composition of claim 26, wherein the antimony compound is antimony trioxide.

* * * * *

UNITED STATES PATENT AND TRADEMARK OFFICE
CERTIFICATE OF CORRECTION

PATENT NO. : 4,171,330
DATED : October 16, 1979
INVENTOR(S) : Kayomon KYO et al

It is certified that error appears in the above-identified patent and that said Letters Patent are hereby corrected as shown below:

IN THE HEADING:

ADD:

Foreign Application Priority Data

January 27, 1977  Japan.................. 52-8347
January 27, 1977  Japan.................. 52-8348

Signed and Sealed this

Twenty-fifth Day of December 1979

[SEAL]

Attest:

SIDNEY A. DIAMOND

Attesting Officer   Commissioner of Patents and Trademarks